Oct. 30, 1928.
F. W. ERICKSON
HAND SEED PLANTER
1,689,866
Original Filed Nov. 16, 1922   2 Sheets-Sheet 1
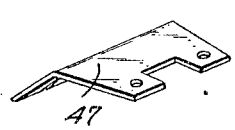
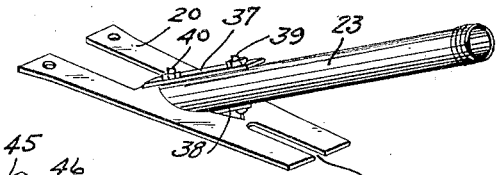
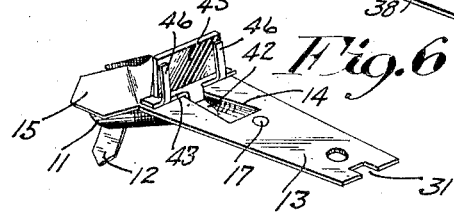
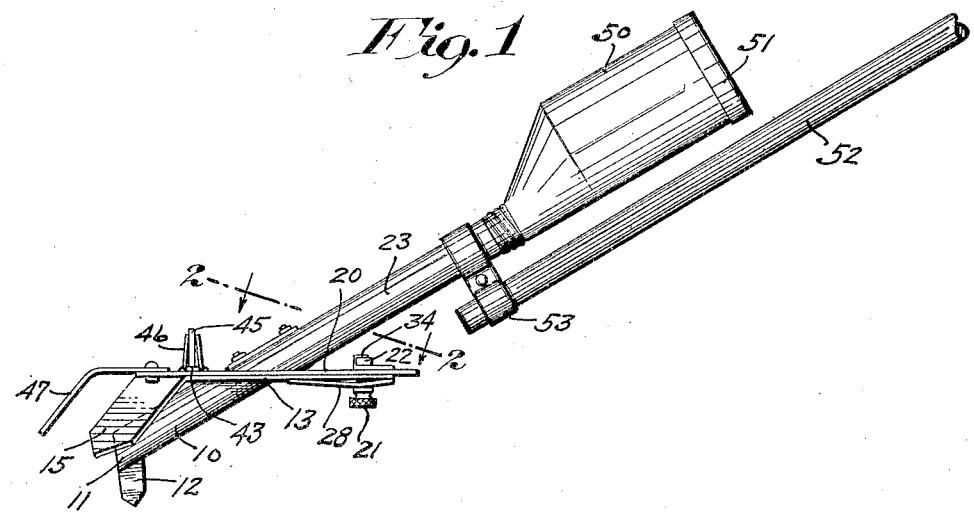
Inventor
Fred. W. Erickson
By his Attorneys
Merchant & Kieson

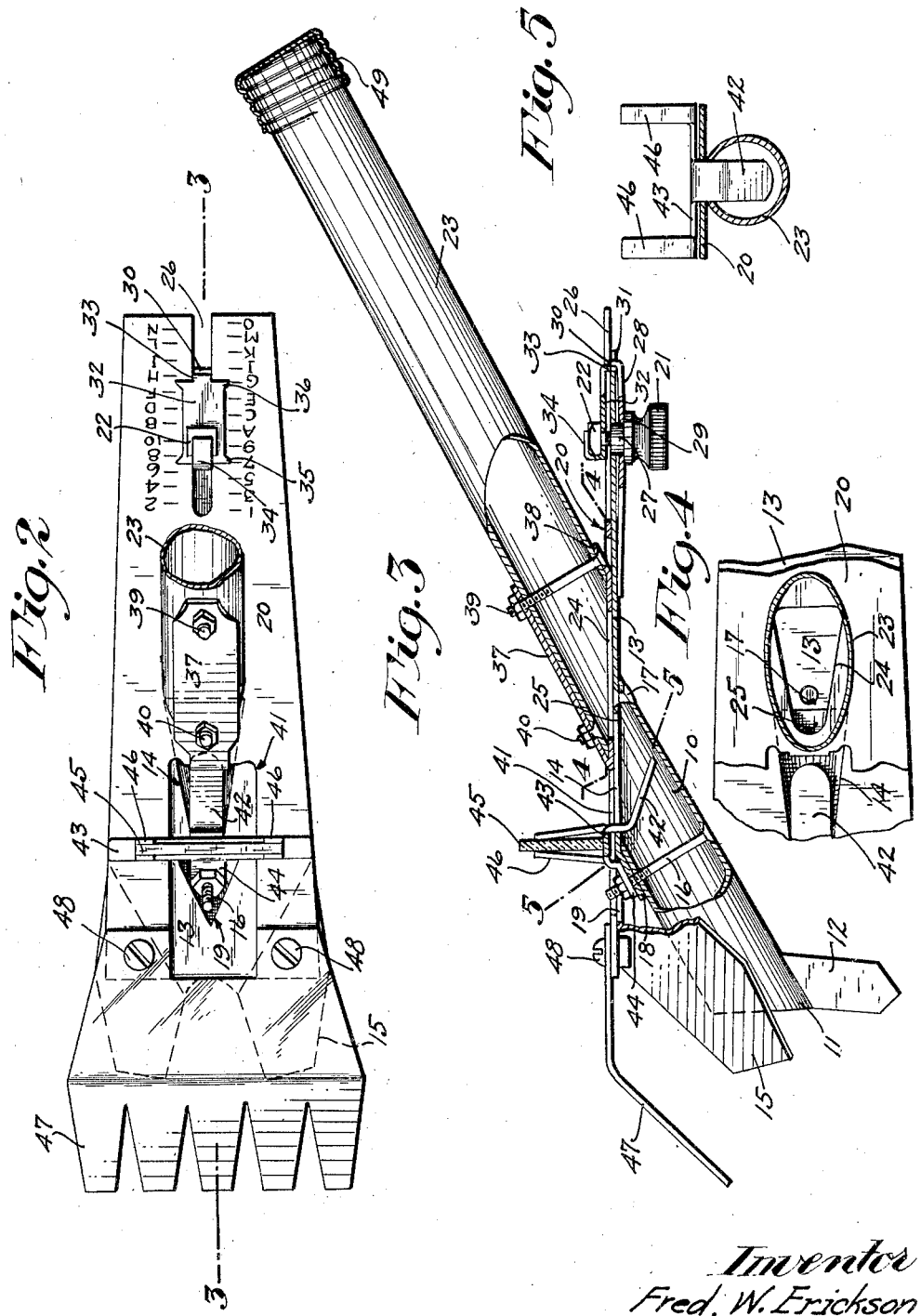

Patented Oct. 30, 1928.

1,689,866

UNITED STATES PATENT OFFICE.

FREDRICK W. ERICKSON, OF AURORA, ILLINOIS.

HAND SEED PLANTER.

Application filed November 16, 1922, Serial No. 601,254. Renewed April 2, 1928.

My invention has for its object to provide a simple and highly efficient hand seed planter, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a side elevation of the improved hand seed planter;

Fig. 2 is a plan view, on an enlarged scale, with some parts sectioned on the line 2—2 of Fig. 1;

Fig. 3 is a view partly in side elevation and partly in longitudinal central section, taken on the line 3—3 of Fig. 2;

Fig. 4 is a fragmentary detail view, with some parts sectioned on the line 4—4 of Fig. 3;

Fig. 5 is a detail view with some parts sectioned on the line 5—5 of Fig. 3;

Fig. 6 is a perspective view of the hand seed planter with the top plate and seed magazine removed;

Fig. 7 is a perspective view of the top plate and seed magazine; and

Fig. 8 is a perspective view of the secondary furrow cover.

The numeral 10 indicates a rearwardly inclined seed delivery spout in the form of a tube, the lower end of which is beveled in substantially a vertical plane and affords a furrow opener 11, to which is rigidly secured a depending combined furrow breaker and guide blade 12. At its upper end, the seed delivery spout 10 is beveled in substantially a horizontal plane and is closed by a bottom plate 13, except for an aperture 14 therein. This bottom plate 13 extends both forward and rearward of the upper end of the seed delivery tube 10 and has formed with its forward end a primary seed covering device or furrow closer in the form of a pair of forwardly and laterally inclined wings or blades 15 between which the furrow opener extends. Said bottom plate 13 is rigidly secured to the seed delivery spout 10 by a nut-equipped bolt 16 and a rivet 17. This bolt 16 extends completely through the seed delivery spout 10, and a strap 18 is cut and pressed from the bottom plate 13 and bears upon the upper surface of said spout. In cutting and pressing the strap 18 from the bottom plate 13, there is formed therein a slot 19 which is forward of the seed aperture 14 and longitudinally aligned therewith.

A top plate 20 is supported on the bottom plate 13 and is pivoted thereto, at its rear end portion for manually operated transverse oscillatory movement, by a knurled thumb screw 21 having a nut 22. Rigidly secured to the top plate 20, forward of its pivot 21, is a main seed magazine 23 in the form of a tube, the axis of which is parallel to the axis of the seed delivery spout 10 and forms an extension thereon. This seed magazine also affords a handle by which the planter may be held and operated.

The thumb screw 21 is anchored to the bottom plate 13 by inserting the same through a bore therein with freedom for a limited endwise movement. The threaded end portion of the thumb screw 21 is reduced to afford a shoulder 27, and said reduced portion of the thumb screw inserted through a longitudinal slot in the top plate 20 rearward of the magazine 23. By tightening the nut 22 on the thumb screw 21, the top plate 20 may be frictionally clamped between said nut and the shoulder 27 to connect said top plate to the bottom plate 13 in different longitudinal adjustments thereon. In Fig. 3 the nut 22 and shoulder 27 are shown released from the top plate 20 to permit longitudinal adjustment of said top plate on the bottom plate 13.

A bowed spring 28 is interposed between a shoulder 29 on the thumb screw 21 and the bottom plate 13, and is secured to said screw by forming a bore in the intermediate portion thereof and inserting said screw therethrough. The ends of the spring 28 bear upon the bottom plate 13, and the intermediate portion of said spring reacts against the shoulder 29 as a base of resistance. The purpose of this spring 28 is to frictionally hold the top plate 20 onto the bottom plate 13 but with sufficient freedom to permit the top plate 20 to be oscillated on the pivot-acting thumb screw 21. To prevent the spring 28 from turning on the bottom plate 13 under the action of the thumb screw 21, the rear end thereof is upturned to afford a lug 30 which extends into a notch 31 in the rear end of the bottom plate 13.

An indicator plate 32 is secured to the thumb screw 21, by forming in said plate a bore through which said screw extends, and which plate is arranged to slide on the top plate 20 during the bodily adjustment of the thumb screw 21 in the bifurcated end 26 of the top plate 20. To hold the indicator plate 32 from turning on the thumb screw 21, the same is provided with a downturned lug 33 which extends into the slot 26. The nut 22 is held from turning, during the adjustment of the thumb nut 21 therein, by forming with the front end of the indicator plate 32 an upstanding lug 34, the upper end of which extends over said nut. On the two front corners of the indicator plate 32, are pointers 35 which cooperate with graduations numbered 1 to 10, inclusive, on the top plate 20. The rear two corners of the indicator plate 32 are also provided with pointers 36 which cooperate with graduations on the top plate 20 indicated by the letters $a$ to $o$, inclusive. The purpose of the pointers 35 and 36 and cooperating graduations is to axially offset the seed magazine 23 from the delivery spout 10 to vary the size of the port 25 for different sized seeds. By means of these pointers and graduations, the top plate 20 may be moved on the bottom plate 13 one-eighth, one-sixteenth, one-thirty-second, or one-sixty-fourth of an inch. In actual usage of the hand seed planter, a chart indicating the proper adjustment of the port 25 for different kinds of seeds will be provided or indicated on said planter.

The seed magazine 23 is rigidly secured to the top plate 20 by cutting and pressing said plate from front and rear straps 37 and 38, respectively, both of which are secured to said magazine by a long nut-equipped bolt 39, and the former of which straps is further secured to the seed magazine 23 by a short nut-equipped bolt 40. In forming the strap 37, the top plate 20 is bifurcated and affords a sight opening 41 which overlies the forward portion of the aperture 14, thus exposing the interior of the seed delivery spout 10.

To permit the operator to watch the discharge of seed from the port 25, through the spout 10, said seed is intercepted by a table plate 42 formed with a transverse bar 43 which overlies the top plate 20 forward of the aperture 14. This table plate 42 extends obliquely into the delivery spout 10 through the sight opening 41 and aperture 14. As best shown in Fig. 5, the table plate 42, at its free ends and longitudinal edges, terminates short of the interior walls of the delivery spout 10 so that the seed deposited on said table plate is free to roll therefrom. The transverse bar 43 is held in position by forming therewith a forwardly projecting strap 44 held by the bolt 16. The transverse bar 43, which closely overlies the top plate 20, holds the front end portion of said plate onto the bottom plate 13, and a strap 44 forms a stop which limits the oscillatory movement of said top plate on the bottom plate. To give the operator a better view of the table plate 42 so that he may watch the seed as the same is precipitated thereon, there is provided an upright mirror or reflector 45 supported on the transverse bar 43 and yieldingly held between pairs of spring fingers 46 formed in said bar.

Detachably secured to the prongs of the bifurcated front end of the top plate 20 is a secondary seed covering device 47 held in position by nut-equipped bolts 48 and comprising a plurality of edgewise spaced fingers which are rearwardly and downwardly inclined. This secondary seed covering device 47 is arranged to follow the covering blades 15 and smooths and packs the earth on the furrow after the same is closed by the covering blades 15. For certain kinds of seed and certain soil conditions, the secondary seed covering device may not be required and can be easily detached.

A cap 49 normally closes the upper end of the seed magazine 23. To increase the capacity of the seed magazine 23, an auxiliary seed magazine 50 may be screwed onto the upper end thereof after the cap 49 has been removed, and which auxiliary seed magazine is provided with a removable cover 51. A handle extension 52 is detachably secured to the seed magazine 23 by a clamping bracket 53 which holds said handle axially offset to clear the auxiliary magazine 50.

In operating the improved hand seed planter, the operator grasps either the seed magazine 23 as a handle or the handle extension 52 and draws the seeder over the ground to cause the furrow opener 11 to open a furrow, and at the same time he manually oscillates said magazine, while the seed delivery spout is held against lateral movement by the furrow, to agitate and cause the seed to flow through the port 25. During this oscillatory movement of the seed magazine 23, the furrow opener is held by the depending guide blade 12 so as to form a straight furrow.

The above described invention has, in actual commercial usage, proven highly efficient for the purpose had in view.

What I claim is:

1. A seed planter comprising a lower plate having a depending combined furrow opener and seed delivery spout, an upper plate pivoted on the lower plate for transverse oscillatory movement, and a seed magazine on the upper plate, said two plates having coincident apertures that afford a port through which seed is discharged from the seed magazine into the combined furrow opener and seed delivery spout.

2. The structure defined in claim 1 in further combination with means whereby one of said plates may be adjusted longitudinally on the other at their pivotal connection to vary the size of said port.

3. The structure defined in claim 1 in further combination with a seed covering device on the upper plate to partake of its transverse oscillatory movements.

4. The structure defined in claim 1 in further combination with yielding means pressing the two plates together.

In testimony whereof I affix my signature.

FREDRICK W. ERICKSON.